United States Patent [19]

Verachtert

[11] Patent Number: 4,491,565

[45] Date of Patent: Jan. 1, 1985

[54] COUNTERCURRENT LIQUID-LIQUID CONTACTING APPARATUS

[75] Inventor: Thomas A. Verachtert, Wheeling, Ill.

[73] Assignee: UOP Inc., Des Plaines, Ill.

[21] Appl. No.: 459,558

[22] Filed: Jan. 20, 1983

[51] Int. Cl.³ .............................................. B01D 11/04
[52] U.S. Cl. ................................. 422/256; 196/14.52; 210/DIG. 5
[58] Field of Search ................ 422/256; 261/106, 112; 208/208 R; 585/800, 833; 260/708; 210/500.1, 799, DIG. 5

[56] References Cited

U.S. PATENT DOCUMENTS

| | | | |
|---|---|---|---|
| 2,215,359 | 9/1940 | Livingston et al. | 422/256 X |
| 2,299,426 | 10/1942 | Rosebaugh | 422/256 X |
| 2,662,001 | 12/1953 | Burns et al. | 422/256 X |
| 2,853,432 | 9/1958 | Gleim et al. | 196/32 |
| 2,921,021 | 1/1960 | Urban et al. | 208/205 |
| 2,988,500 | 6/1961 | Gleim et al. | 208/206 |
| 3,226,092 | 12/1965 | Graham et al. | 422/256 X |
| 3,238,124 | 3/1966 | Burton | 261/112 X |
| 3,351,434 | 11/1967 | Grimes et al. | 23/310 |
| 3,408,287 | 10/1968 | Urban et al. | 208/207 |
| 3,496,996 | 2/1970 | Osdor | 422/256 X |
| 3,585,005 | 6/1971 | Coggan | 422/256 X |
| 3,758,404 | 9/1973 | Clonts | 208/263 |
| 3,839,487 | 10/1974 | Clonts | 260/683.48 |
| 3,977,829 | 8/1976 | Clonts | 23/267 MS |
| 3,989,466 | 11/1976 | Pan | 422/256 X |
| 3,992,156 | 11/1976 | Clonts | 23/267 MS |
| 4,219,420 | 8/1980 | Müller | 210/500.1 X |

OTHER PUBLICATIONS

Chemical Engineering, 01-19-76, pp. 86-100, "Liquid-- Liquid Extraction: The Process, the Equipment" by P. J. Bailes et al.

Primary Examiner—Barry Richman
Assistant Examiner—Brion P. Heaney
Attorney, Agent, or Firm—James R. Hoatson, Jr.; John F. Spears, Jr.; William H. Page, II

[57] ABSTRACT

A liquid-liquid contacting apparatus is disclosed. The apparatus is useful in extracting mercaptans from a hydrocarbon stream such as cracked gasoline by non-turbulent countercurrent contacting of the hydrocarbon stream with an aqueous caustic solution. The denser liquid phase flows downward from an upper phase separation zone through a connecting cylindrical contacting zone into a lower phase separation zone. Liquid withdrawal and addition means communicate with each separation zone. A mass of fibrous contacting strands is suspended in the contacting zone. The contacting strands are preferentially wetted by either of the two liquid phases to provide a large surface area which enhances extraction capacity.

4 Claims, 3 Drawing Figures

COUNTERCURRENT LIQUID-LIQUID CONTACTING APPARATUS

FIELD OF THE INVENTION

The invention relates to the design and usage of apparatus for contacting two immiscible liquids for the purpose of performing a liquid-liquid extraction. The invention more specifically relates to liquid-liquid extraction apparatus in which the extraction is promoted by providing a large surface area which is preferentially wetted by one of the two immiscible liquids. This type of apparatus intentionally limits or eliminates turbulent admixture of the two liquids and thereby does not form emulsions or other mixtures which require extensive holding times in separation zones after the contacting step. The invention also specifically relates to apparatus used to extract mercaptans from various petroleum-derived streams by contact with an aqueous caustic solution.

PRIOR ART

Liquid-liquid extraction is a well developed process which is used commercially in a number of industries including the chemical, petroleum and petrochemical industries. A survey article describing extraction theory, processes and equipment is presented in an article at page 86 of the Jan. 19, 1976 edition of *Chemical Engineering*. The many types of equipment described in this article basically provide a means of providing a large number of extraction stages in series, with each stage providing turbulent admixture of the two liquids followed by a phase separation step in a more quiescent volume. The normal flow path provides countercurrent flow of the two liquids, although the use of cocurrent flow is appreciated by those skilled in the art. A common means of achieving this countercurrent flow is to pass the less dense liquid feed stream into the lower portion of a vertical extraction tower and to allow this stream to rise through the column while a denser liquid charged to the top portion of the column descends. The two liquids are admixed at various vertically spaced apart points in the column either by static mixing means or by moving agitators.

A liquid-liquid contacting apparatus which employs a mass of preferentially wetted fibers is presented in U.S. Pat. Nos. 3,758,404; 3,839,487; 3,977,829 and 3,992,156 issued to K. E. Clouts. The fibers extend from an inlet for the liquid which preferentially wets the fibers through a cylindrical contacting zone and into a separation zone from which both liquids are withdrawn. The liquid deposited on the fibers is moved along the fibers by the viscous drag occurring between the two concurrently flow liquids. This provides large liquid surface areas which are subjected to movement which promotes uniform liquid composition throughout the liquids, thereby yielding high extraction efficiencies. The two liquids are subjected to only a minor amount of turbulent admixture and therefore do not become intimately dispersed as in the previously described more conventional contactors. It is believed that the fiber film contactors described in these references all utilize cocurrent flow through the contacting zone.

U.S. Pat. No. 3,351,434 issued to P. G. Grimes et al is pertinent for showing a different form of contacting apparatus which employs preferentially wetted materials. The preferentially wetted materials are in the form of vertically aligned rotating disks which contact upper and lower layers of the two liquids. The reference indicates it is preferred that the two liquids flow countercurrent to each other.

The contactor patents cited above describe the use of the contacting devices in such processes as the extraction of mercaptans from a hydrocarbon stream with an aqueous caustic solution, the removal of diethylamine from toluene with aqueous $H_2SO_4$, and the alkylation of acyclic hydrocarbons with a mineral acid catalyst such as HF. A further and more complete description of the preferred use of the subject invention, the extraction of mercaptans from hydrocarbons, is provided in U.S. Pat. Nos. 2,853,432; 2,921,021; 2,988,500 and 3,408,287.

BRIEF SUMMARY OF THE INVENTION

The invention provides a new and useful liquid-liquid extraction apparatus in which the reactants are not intimately dispersed during the contacting operation. Countercurrent flow is provided through a contacting zone containing vertical strands which are preferentially wetted by one of the two liquid phases. One broad embodiment of the invention may be characterized as a liquid-liquid contacting apparatus which comprises a vertical enclosed outer vessel having upper and lower ends, the vessel having upper and lower phase separation zones located respectively at the upper and lower ends of the outer vessel and an intermediate contacting zone having a height from top to bottom equal to at least one-third of the overall height of the outer vessel and extending vertically between the upper and the lower phase separation zones; a mass of contacting strands extending vertically between the phase separation zones and located within the contacting zone; a first liquid distribution means which communicates with a first inlet conduit and which is located in the upper phase separation zone immediately above said mass of contacting strands; a second liquid distribution means which communicates with a second inlet conduit and which is located in the lower phase separation zone below said mass of contacting strands; a first outlet conduit communicating with the upper phase separation zone at a point above the first liquid distribution means; and a second outlet conduit communicating with the lower phase separation zone at a point below the second liquid distribution means.

DETAILED DESCRIPTION

Figure 1:
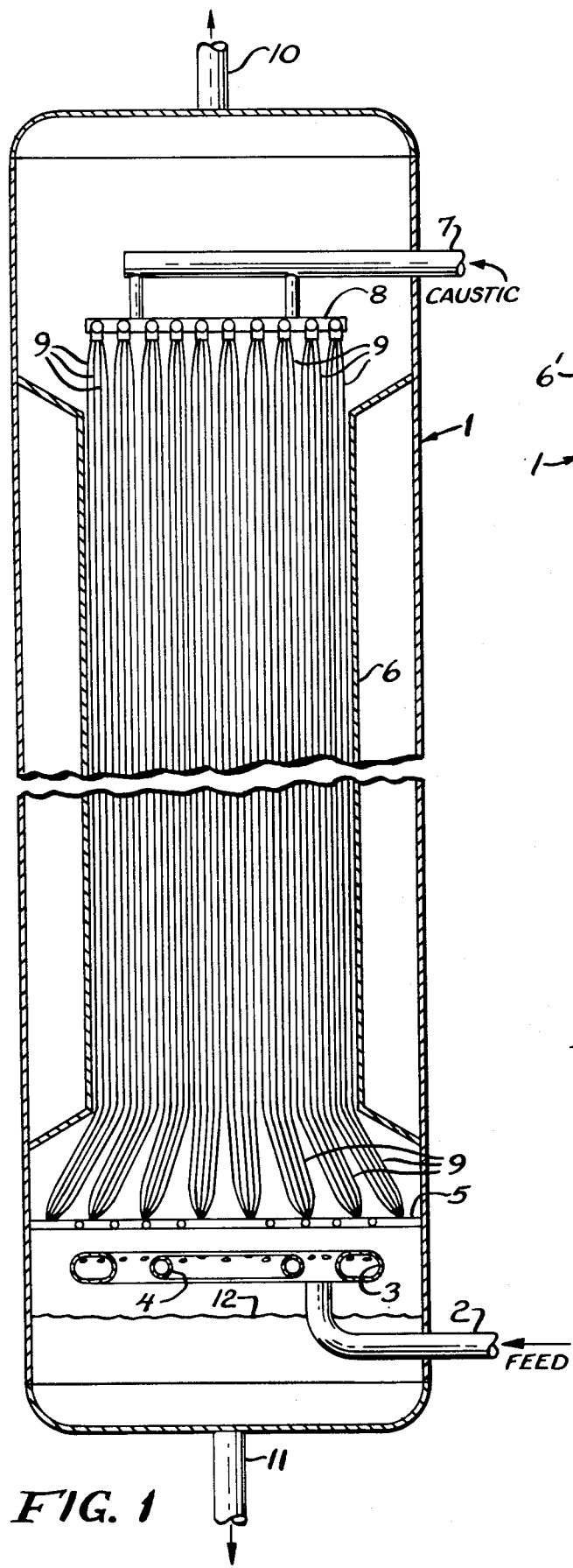
FIG. 1 is a cross-section taken on a vertical plane through one embodiment of the subject apparatus.

Countercurrent liquid-liquid extraction is widely used to perform purifications or separations in the food, chemical, petroleum and petrochemical industries. Since the transfer of the compound or compounds which move from one of the immiscible liquids to the other occurs at the interface between the two liquids, much of the classical approach to countercurrent extraction is concentrated on providing large surface areas by the dispersion of one liquid into the other through the use of either moving or static mixing devices. For instance, the two liquid phases may be admixed through rotating paddles or agitators provided at different levels within a vertical contacting vessel or the liquid phase rising through the vessel may be caused to pass through a number of small perforations such that it is ejected into the other liquid in the form of a number of small droplets or a high velocity stream. Besides increasing the surface area available for mass transfer, this agitation admixes the contents of the two liquid phases thereby increasing the rate of mass transfer by carrying the transferred compounds to and from the liquid interface.

Although the presently used extraction columns have achieved a high degree of efficiency and reliability, there still remain areas in which definite operational improvements are desirable. For instance, energy must be supplied to effect the admixture of the two liquids thereby increasing the utility costs of operating the process. A second disadvantage of countercurrent extraction apparatus is present when a significant settling time is required for a complete separation of the two phases following an intimate admixture which results in small droplets of one liquid phase being present in the other liquid. This settling time depends on such factors as the difference in the specific gravity of the two liquids and the size of tne droplets, with smaller droplets requiring a much longer settling time. The failure to provide an adequate settling time results in the "carry-over" of a portion of one of the liquid phases as droplets suspended in the other liquid when the two liquids are separated and subsequently withdrawn from the process. Separation of the two liquid phases is normally performed in a settling zone maintained at quiescent conditions which promote settling and which may contain coalescing means extending across the path of fluid flow. Longer settling times are provided by increasing the size of the separation zone. When a large settling time is required, the result may be the necessity of providing a very large independent vessel for use solely as a separation zone. This increases the capital cost of the apparatus required to practice the process and the inventory of the chemicals which must be retained within the apparatus.

It is therefore an objective of the subject invention to provide an efficient apparatus for countercurrent contacting of two immiscible liquids which does not cause the turbulent admixture of the two liquids. It is another objective of the invention to provide an apparatus for the extraction of mercaptans or aromatic hydrocarbons from a hydrocarbonaceous feed stream. It is a further objective of the invention to provide an improved fiber film contacting apparatus capable of achieving higher extraction efficiencies than the prior art cocurrent flow fiber film contactors.

The construction and operation of the apparatus may be discerned by reference to the Drawing. In FIG. 1, a feed stream, a naphtha boiling range hydrocarbon stream produced at least in part by the cracking of heavier hydrocarbons and which comprises a small amount of undesired mercaptans, enters the outer vessel 1 of the apparatus through an inlet conduit 2. This inlet conduit communicates with a liquid distribution means comprising a circular distribution pipe 3 and the smaller diameter distribution pipe 4. The hydrocarbon stream flows out of a number of perforations provided in distribution rings and flows upward towards the top of the vessel. The naphtha boiling range material enters above the caustic-hydrocarbon interface 12 and rises into a contacting zone located within the cylindrical interior wall 6 which has a smaller diameter than the cylindrical sidewall of the outer vessel. The naphtha continues to flow upward through the entire contacting zone wherein the naphtha is brought into contact with the aqueous caustic solution which preferentially wets the numerous contacting strands 9. Upon leaving the top of the contacting zone, the naphtha emerges into an upper separation zone which is devoid of the contacting strands and maintained at quiescent conditions which promote the settling of any of the aqueous caustic solution entrained within the hydrocarbon phase. The treated naphtha stream is then reroved from the apparatus through the outlet conduit 10 at the top of the apparatus.

An aqueous caustic stream is fed into the apparatus through an inlet conduit 7 located in the upper separation zone and fed into a distribution manifold 8. The caustic stream emerges through a plurality of perforations distributed along the individual members of the distribution manifold and immediately falls upon bundles of the contacting strands 9. The aqueous solution preferentially wets the individual strands and is carried downward by the action of gravity since it is the denser of the two liquid phases. The caustic travels downward through the contacting zone countercurrent to the naphtha stream which rises in the large number of small, very elongated passageways which are present between the contacting strands. After emerging from the bottom of the contacting zone, the caustic solution is collected as part of the quantity of aqueous liquid retained below the interface 12. The mercaptan-rich caustic is withdrawn through the outlet conduit 11. To prevent the entanglement of the contacting strands or their concentration into any portion of the contacting zone, the lower ends of the contacting zone are attached to a restraining means 5. The strand-restraining means is preferably a horizontal lattice work to which the individual bundles of contacting strands are attached and which slightly spreads the bottom of the mass of contacting strands to aid in the separation of the caustic and to hinder the channeling of the rising hydrocarbons along the surface of the interior wall 6.

Figure 2:
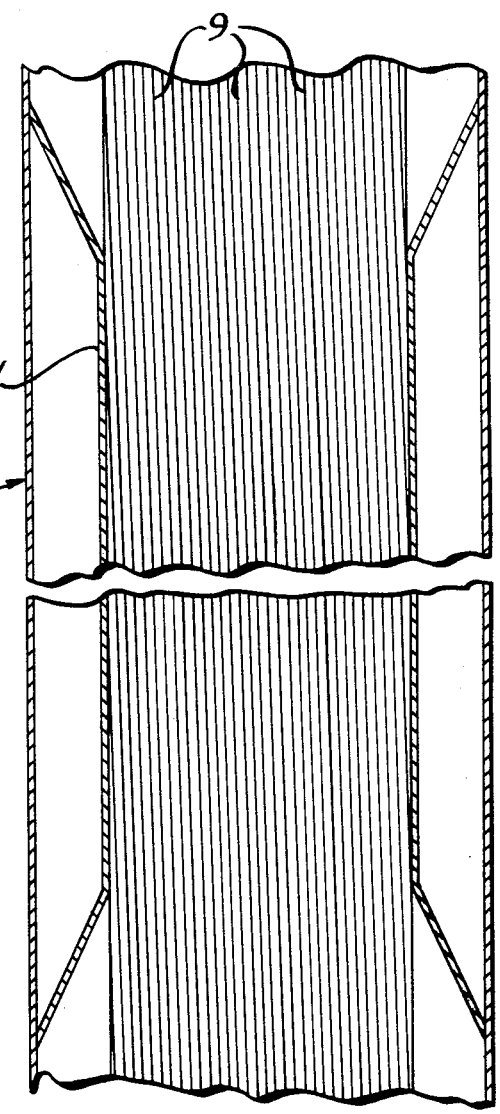
FIG. 2 is a similar cross-section taken through an embodiment of the apparatus in which the contacting strands 9 are inclined from vertical as they extend through the contacting zone.
Figure 3:
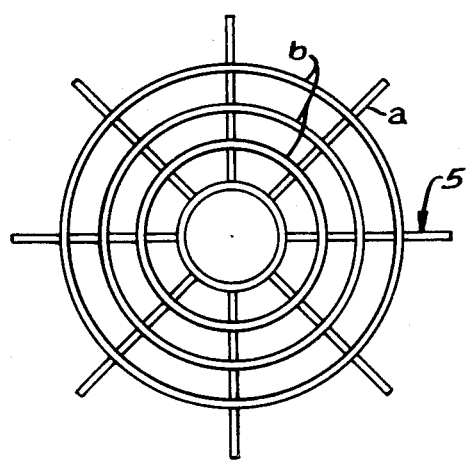
FIG. 3 is a representation of the preferred construction of the restraining means 5 employed in the lower phase separation zone.

FIG. 2 illustrates a slightly different embodiment of the invention in the form of a cross-section of the apparatus taken along a vertical plane in the same manner as FIG. 1. The interior wall 6' forms a cylindrical contacting zone having a smaller diameter and cross sectional area than the separation zones and is slightly more tapered than the interior wall shown at FIG. 1. However, the most significant difference between this embodiment and that of FIG. 1 resides in the slight inclination of the contacting strands 9 from the true vertical inclination shown within the contacting zone in FIG. 1. The purpose of this inclination is to increase the contacting and surface admixture which occurs within the contacting zone. All other aspects of this embodiment of the invention are identical to that shown in FIG. 1. FIG. 3 presents a detailed illustration of the view seen when looking downward upon a preferred design for the restraining means 5 which is utilized in the lower separation zone of the subject apparatus. The restraining means preferably comprises a number of straight, inflexible supports 'a' fastened to the evenly spaced apart circular rings 'b' to provide a bulls eye-type unitary structure which may be fastened in a horizontal plane by attachment to the inner surface of the outer wall of the vessel.

The entire apparatus is preferably contained within an enclosed cylindrical vessel having a vertical major axis. This vessel would have upper and lower ends enclosed by the customary semi-eliptical heads and would be designed in accordance with the appropriate pressure vessel and other structural codes. The outer vessel is preferably made out of a metal such as carbon or stainless steel but can be fabricated from a synthetic material such as fiber-reinforced resins. The outer vessel will normally be from about 1 to about 8 meters in diameter and from about 5 to about 22 meters in length.

The outer vessel may be modified from the preferred embodinents illustrated in the Drawing. For instance, the contacting zone may have a square cross-section. Another modification would comprise the utilization of a separate cylindrical section as the contacting zone, with the upper and lower ends of the contacting zone being attached to other cylindrical structures having larger diameters. An apparatus having a structure similar to this would result if the portion of the outer cylindrical wall 1 shown in FIG. 1 which is parallel to and adjacent the interior cylindrical wall 6 was eliminated to thereby provide an apparatus having enlarged upper and lower cylindrical volumes utilized as the separation zones. This variation may in many instances be preferred over the structure shown in the Drawing since internal walls, such as 6, are generally undesirable from a maintenance point of view in process equipment. In another possible arrangement of the outer vessel, the upper and lower separation zones would be formed by horizontal cylindrical structures attached to a vertical cylindrical contacting zone at a right angle to the central axis of the contacting zone. It is contemplated that in this embodiment of the apparatus, the contacting zone would be attached to one end of each of the separation zones to result in an overall outer vessel having a C-shaped vertical cross section. The horizontal portion of the overall apparatus may be similar to customary settling vessels in overall design.

Both the upper separation zone and the lower separation zone will have communicating therewith an inlet conduit for the addition of the liquid which enters this zone and an outlet conduit for the other liquid stream. As is customary in vertical countercurrent extraction apparatus, the outlet conduit in the upper separation zone will communicate with the internal volume of the upper separation zone at a point above the level at which the inlet conduit communicates with this volume. Likewise in the lower separation zone, the inlet conduit will communicate with the internal volume of the lower separation zone at a level significantly above the point at which the outlet conduit communicates with this lower volume. The distance between the level at which the inlet and outlet conduits communicates with the internal volume of the respective separation zone must be such to allow a sufficient volume for the adequate separation of the two liquid phases. A coalescing means, such as wire mesh or a bed of charcoal, may be located in either of the separation zones.

Despite the fact that no turbulent admixture of the two liquid phases is intentionally performed in the contacting zone, a sufficient separation volume must be allowed at each end of the vessel to allow settling of any liquid which is entrained in the other phase to thereby minimize carry-over and to provide a safety margin for periods of misoperation or temporary upsets to the process. The separation volume may be increased by either increasing the distance between the inlet and outlet levels or by increasing the diameter of the separation zone. As illustrated in FIGS. 1 and 2, it is preferred that there is at least some increase in the cross-sectional area of the separation zones as compared to the cross-sectional area of the contacting zone to promote separation of the two liquid phases. The increased cross-sectional area also compensates for the presence of the various structures located in the separation zones which have the effect of reducing the area available for fluid flow and thereby increasing liquid velocities. As used herein, the term "contacting zone" is intended to indicate that central portion of the apparatus which contains suspended contacting strands which are exposed to both liquid phases for the purposes of extraction. The separation zones begin at the terminations of the contacting zone.

It is preferred that a liquid distribution means is present in both the upper and the lower separation zones to spread the flow of the incoming liquid streams over the total cross-sectional area of the contacting zone and thereby aid the establishment of uniform countercurrent flow of the two liquid phases. However, since in the embodiment shown in FIG. 1 the less dense liquid phase enters above the interface between the two liquids, the lower distribution means employed in conjunction with the addition of the "continuous" phase may be of a more rudimentary nature designed primarily to prevent the entrance of the less dense liquid from disturbing or admixing the liquid present in the lower separation zone. Assuming the denser liquid preferentially wets the strands, the hydrocarbon or other less dense liquid will preferably fill the majority of the available void volume present within the contacting zone thereby totally surrounding the contacting strands carrying the denser phase. The natural upward flow of the less dense liquid will therefore ensure that all of the contacting strands are brought into contact with the rising liquid. In contrast, it is highly preferred that a very effective flow distribution means is utilized to evenly disburse the liquid phase which preferentially wets the contacting strands. It is therefore preferred that the openings of the distribution means used for the placement of this liquid stream are located such that the wetting liquid falls upon or exits within a bundle of the contacting strands. A distribution means should ensure that each strand receives an adequate and approximately equal supply of the preferentially wetting liquid. To ensure the desired even distribution, the contacting strands may be attached to the distribution means which supplies the preferentially wetting liquid. The strands may therefore be suspended or retained as the case may be by the distribution means or the distribution means may release the wetting liquid at points within the preferred bundles of contacting strands. In the latter instance, the contacting strands would be draped over and surround the outlets of an upper liquid distribution means.

The contacting strands may be made from essentially any material which satisfies the several requirements including sufficient tensile strength, the property of being preferentially wetted by one of the liquids fed to the extraction apparatus, and the ability to withstand the conditions and the environment present within the apparatus during operation. Other significant factors involved in the choice of the contacting strand material include the cost of the material and the ease of fabrication and installation of strands made from the material.

The contacting strands may therefore be made from metal such as carbon steel or stainless steel and various non-metallic materials including natural and synthetic fibers such as nylon, polystyrene, polybutylene, polyethylene, polypropylene, polymerized fluorocarbons, polymerized acrylics and various copolymers produced from two or more monomers. The surface of the strands may be roughened to vary their wetting characteristics. Either the rising or the descending liquid may preferentially wet, with the other liquid forming the continuous phase of the process.

The individual contacting strands may have a diameter ranging from about 5 to about 2000 microns but preferably have a diameter ranging from about 15 to about 200 microns. The number of contacting strands employed in any specific apparatus will be dependent on the cross-sectional area available within the contacting zone. A minimum number of contacting strands must be supplied which is necessary to provide the necessary surface area to achieve the desired extraction efficiency and capacity. However, sufficient space must be provided within the contacting zone to allow the free movement of the continuous phase countercurrent to the liquid phase present on the contacting strands. A decrease in the cross-sectional area available for the flow of the continuous phase results in an increased velocity of the continuous phase with high countercurrent velocities tending to retard the movement of the liquid attached to the contacting strands. The individual contacting strands are preferably assembled and installed as multi-strand bundles preferably comprising from about 20 to about 5000 strands per bundle. Provision is made at the end of each bundle for both attaching the bundle to the appropriate support or restraining means and for spreading the individual fibers to allow entrance and passage of the continuous phase through the interior portions of the bundle. The number of individual strands provided within the contacting zone may be expressed in terms of the fill density, which is defined as the ratio of the combined cross-sectional area of all of the contacting strands traversing the contacting zone divided by the cross-sectional area originally available within the contacting zone taken on a horizontal plane perpendicular to the contacting strands. The fill density, which is expressed as a percentage, will normally range from about 0.25 to about 15 percent but is preferably between 1.0 and 5.0 percent. The contacting strands may be formed from twisted, braided or woven groupings of very fine fibers or substrands.

The individual contacting strands, or the preferred bundles of contacting strands, are preferably attached to a restraining means located at the lower end of the contacting fibers. The purpose of the restraining means is to prevent excessive movement of the contacting strands which may lead to abrasion, breakage or entanglement of the contacting strands. The contacting strands are preferably not tensioned between the supporting means and the restraining means. To speed the erection of the finished apparatus at its place of utilization, the entire assembly of the support apparatus, the contacting strands and at least a portion of the restraining means may be assembled as a unitary system which is transported to the construction site and lowered into the contacting zone through the top of the outer vessel. This subassembly may be surrounded by a removable protective coating and rigid support elements may be attached within the contacting system during shipment and installation to prevent damage to the contacting strands and to aid in the movement and handling of the system.

As illustrated in FIG. 2, the contacting strands may be inclined from a true vertical orientation by a slight angle. The purpose of this inclination is to cause the continuous phase to gently impact upon at least one surface of the contacting strands to thereby promote gentle admixture of both the continuous phase and the liquid phase attached to the contacting strands. This is intended to minimize the possible bypassing of the continuous phase through any portion of the contacting zone which is devoid of the contacting strands due to a misalignment of the strands or damage to the strands. The preferred method of achieving the desired slight inclination is by the rotation of the restraining means through some small portion of a total rotation after the contacting strands are attached to the restraining means. It is preferred that this rotation is less than 30 degrees, and the inclination is between 1 and 10 degrees.

One of the more widely used extraction processes to which the present invention may be applied is the separation of aromatic hydrocarbons and non-aromatic hydrocarbons such as naphthenes and paraffins. This may be for the purpose of obtaining relatively pure portions of either class of hydrocarbon. This operation is often performed in conjunction with fractionation and/or extractive distillation steps needed to recover the solvent. An example of this is the process described in U.S. Pat. No. 3,844,902. The feed stream will preferably have a specific boiling point range which limits the hydrocarbons to those having from about 6 to 20 carbon atoms per molecule and more preferably from about 6 to 12 carbon atoms. Suitable feed streams include a debutanized reactor effluent from a catalytic reforming unit and a liquid by-product from a pyrolysis gasoline unit which has been hydrotreated for the saturation of olefins and diolefins.

At the heart of the extraction process, is the use of a solvent which is selective for the preselected chemical compound which is to be removed from the feed stream. Besides having this property of selectivity, the solvent material must be substantially immiscible with the feed stream and must also differ in density. There are available and known to those skilled in the art a wide variety of materials which meet these general requirements. For instance, aromatic hydrocarbons may be extracted with a diglycol amine, diethylene glycol, dipropylene glycol, tetraethylene glycol or nformyl morpholine, etc. These chemicals are usually mixed with water to form the actual solvent solution. More detailed information on these solvents is contained in the articles appearing at page 91 of the March, 1973 edition of *Hydrocarbon Processing* and at page 141 of the April, 1972 edition.

A specifically preferred solvent for the separation of aromatics and non-aromatics is one of the sulfolane-type as described in U.S. Pat. No. 3,652,452. A sulfolane-type solvent may be characterized as having a five-membered ring structure containing one sulfur atom and four carbon atoms with two oxygen atoms bonded to the sulfur atom. Preferably, two hydrogen atoms are bonded to each carbon atom. A specific example of a sulfolane-type solvent is tetrahydrothiophene 1,1,dioxide. It is specifically preferred that the solvent contains about 0.5 to 5.0 wt. % water. The closely related solvents 2-sulfolene and 3-sulfolene may also be used. Yet another family of suitable compounds are the sulfones described in U.S. Pat. No. 3,723,303. The feed streams which are contacted with these solvents may contain aromatic and non-aromatic hydrocarbons having from six to nine or more carbon atoms per molecule.

Adequate extraction is obtained through the use of countercurrent contacting performed at suitable extraction conditions. When utilizing a sulfolane-type solvent, these conditions include a pressure from atmospheric to about 35 atmospheres, preferably 3 to 10 atmospheres, and a temperature of from about 25° to about 200° C., preferably about 80° to about 150° C. These conditions are often set by very practical considerations. For instance, the pressure must be sufficient to prevent either liquid phase from vaporizing and is often determined by an upstream or downstream unit on which the pressure in the extraction zone is allowed to "float". Elevated temperatures normally increase the extraction capacity of the solvent but decrease the selectivity such that these effects must be balanced. Solvent quantities should be sufficient to dissolve substantially all the aromatic hydrocarbons present in the extraction zone feed stream. Preferred are solvent to feed ratios, by volume of about 2:1 to about 10:1. These factors are well developed in the art and are dependent on particular situations.

In a liquid-liquid extraction process, the raffinate stream comprises the unextracted or remaining portion of the feed stream, and the extract stream comprises the solvent stream plus the extracted portion of the feed stream. The raffinate stream may have a small amount of the solvent dissolved in it. In some processes, it is customary to refer to the extract stream as the rich solvent stream. In a typical aromatic hydrocarbon liquid-liquid extraction process, the extracted aromatics are subsequently separated from the extract stream as by fractionation.

The subject invention may also be used for the extraction of mercaptans from a hydrocarbon feed stream with an aqueous alkaline solution as is widely practiced in the petroleum industry. This alkaline solution is then effectively regenerated by the catalytically promoted oxidation of the extracted mercaptans to disulfides which are separated from the alkaline solution by decantation. The process may be performed with any alkaline reagent which is capable of extracting mercaptans from the feed stream at practical operating conditions and which may be regenerated in the manner described. A preferred reagent comprises an aqueous solution of an alkaline metal hydroxide, such as sodium hydroxide or potassium hydroxide. Sodium hydroxide may be used in concentrations of from 1-50 wt. %, with a preferred concentration range being from about 5 to about 25 wt. %.

Hydrocarbons which may be treated for mercaptan removal in this manner vary from propane-butane mixtures to the middle distillates. Included in this grouping of feed streams are streams derived from fluidized catalytic cracking plant gas concentration units, natural or cracked gasolines, jet fuels, fuel oils and kerosenes and blends of these. This process may also be used to remove mercaptans from many solvents, alcohols, aldehydes, etc. With the exception of some light $C_3$ or $C_4$ compounds, these materials may be classified as being normally liquid hydrocarbonaceous compounds having boiling points under about 345° C. as determined by the standard ASTM distillation methods. As used herein, the term "normally liquid" is intended to specify a substance which is a liquid at standard conditions (60° F. and 1 atmosphere absolute).

The extraction conditions employed for removing mercaptans may vary greatly depending on such factors as the nature of the hydrocarbon stream being treated and its mercaptan content. In general, the extraction may be performed at an ambient temperature and a pressure sufficient to ensure liquid state operation. The pressure may range up to 68 atmospheres gauge or more, but a pressure in the range from about 3.5 to about 10.0 atmospheres gauge is preferred. The temperature in the extraction zone is confined in the range of 16° to about 121° C., preferably from 25° to 50° C. The ratio of the volume of the alkali solution required per volume of the feed stream will vary depending on the mercaptan content of the feed stream, the nature of the mercaptan, and the nature of the feed stream. The flow rate of the alkaline solution may be from about 1 to about 100% of the flow rate of the hydrocarbon stream. Normally, the flow rate of the alkaline solution will be about 2 to about 25 percent of the flow rate of the hydrocarbon stream. Further details on this extraction process may be obtained from U.S. Pat. Nos. 2,921,020; 2,988,500; 3,108,081; 3,260,665; 3,923,645 and 4,040,947.

The subject invention may also be applied in a treating process such as a process for removing acid gases, such as hydrogen sulfide, from liquid-phase hydrocarbon streams or from vapor-phase streams. This well developed treating process is widely used in petroleum refining, with aqueous amine solutions being the preferred solvents. Diglycolamine at concentrations ranging from about 50-70 wt. % or mono- or diethanolamine and concentrations ranging from about 10 to about 30 wt. % may be used. A positive pressure sufficient to maintain liquid phase conditions and preferably above 1 atmosphere gauge is maintained in the extraction column. The use of an average temperature below 38° C. is preferred during the extraction process, but the temperature may range from about 16° to about 65° C. The rich solvent is regenerated in a stripping column at an elevated temperature in a customary manner, with a temperature in the range of 115° to 150° C. normally being sufficient.

The invention may also be employed in other processes in which different liquid phases are brought into contact for purposes other than extraction including those processes in which hydrocarbons are alkylated through the use of a mineral acid. These processes include the reaction of isobutane with a normal butene to produce high octane gasoline blending components and the alkylation of aromatic hydrocarbons such as the reaction of benzene with $C_3$-$C_{20}$ olefins. This includes the production of detergent precursors by the reaction of benzene with $C_8$-$C_{15}$ linear olefins. Concentrated $H_2SO_4$ may be used as the catalyst but anhydrous liquid HF is the preferred catalyst. These processes are normally performed at a superatmospheric pressure which ensures liquid phase reactants and which may range up to about 600 psig or more and a temperature of from about 40° to about 165° F.

I claim as my invention:
1. A liquid-liquid contacting apparatus which comprises:
   (a) a vertical enclosed outer vessel having a unitary cylindrical sidewall and an upper and lower end, said vessel having a means defining an upper phase separation zone located at the upper end of said vessel, a means defining a lower phase seperation zone located at the lower end of said vessel and means extending vertically between said upper and said lower phase seperation zones defining an intermediate contact zone having a height equal to at least one-third of the overall height of said outer vessel and having a smaller diameter than the diameter of the unitary cylindrical sidewall;

(b) restraining means located within said lower phase separation zone and supporting means located within said upper phase separation zone;

(c) a mass of contacting strands extending vertically between said supporting means and said restraining means in attachment with said supporting means and said restraining means to prevent vertical movement, said restraining means positioning said contacting strands at an inclination to the vertical axis of said intermediate contacting zone of between 1 and 10 degrees;

(d) said supporting means including a first liquid distribution means which communicates with a first liquid inlet conduit and which is located in said upper phase separation zone, said first liquid distribution means distributing a fluid onto said contacting strands;

(e) a second liquid distribution means which communicates with a second liquid inlet conduit and which is located in said lower phase separation zone, said second liquid distribution means being positioned below said restraining means;

(f) a first liquid outlet conduit communicating with said upper phase separation zone positioned at a point above said first liquid distribution means; and, (g) a second liquid outlet conduit communicating with said lower phase separation zone positioned at a point below said second liquid distribution means.

2. The apparatus of claim 1 further characterized in that the cross-sectional area of the contacting zone is less than the cross-sectional area of the phase separation zones.

3. The apparatus of claim 1 further characterized in that the contacting strands are contained in a plurality of multi-strand bundles.

4. The apparatus of claim 1 further characterized in that the contacting strands are preferentially wetted by aqueous liquids.

* * * * *